F. A. BRAYMAN.
TRAP.
APPLICATION FILED JULY 25, 1912.
1,071,025.
Patented Aug. 26, 1913.
2 SHEETS—SHEET 1.
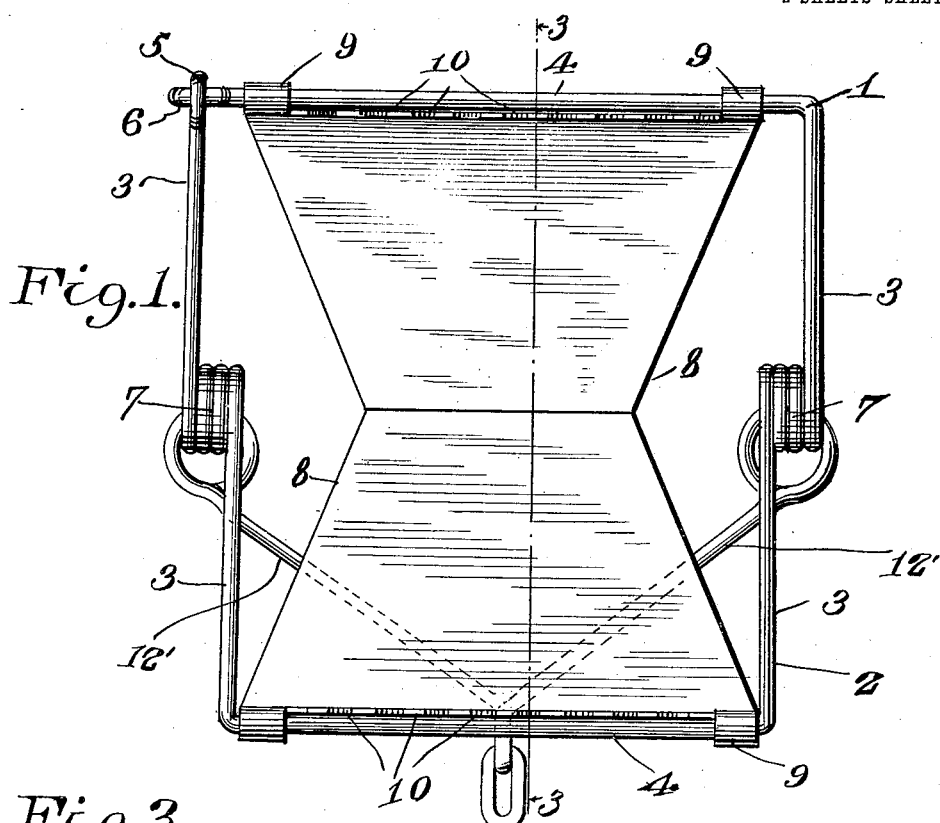
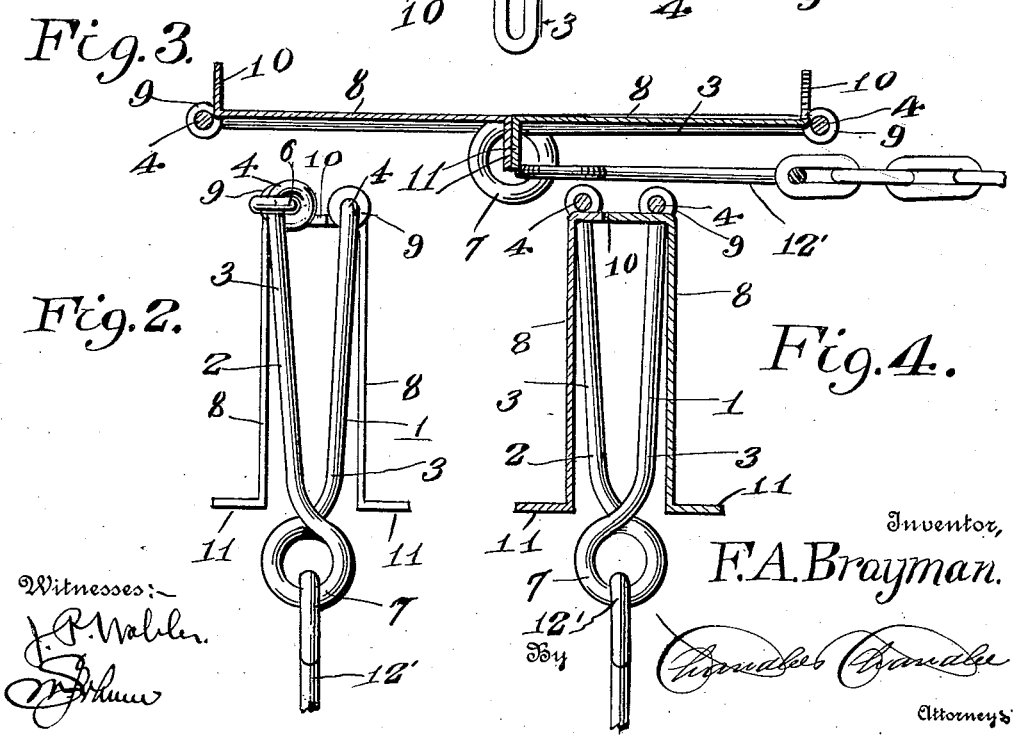
Witnesses:
Inventor,
F. A. Brayman.
By
Attorneys F. A. BRAYMAN.
TRAP.
APPLICATION FILED JULY 25, 1912.
1,071,025.
Patented Aug. 26, 1913.
2 SHEETS—SHEET 2.
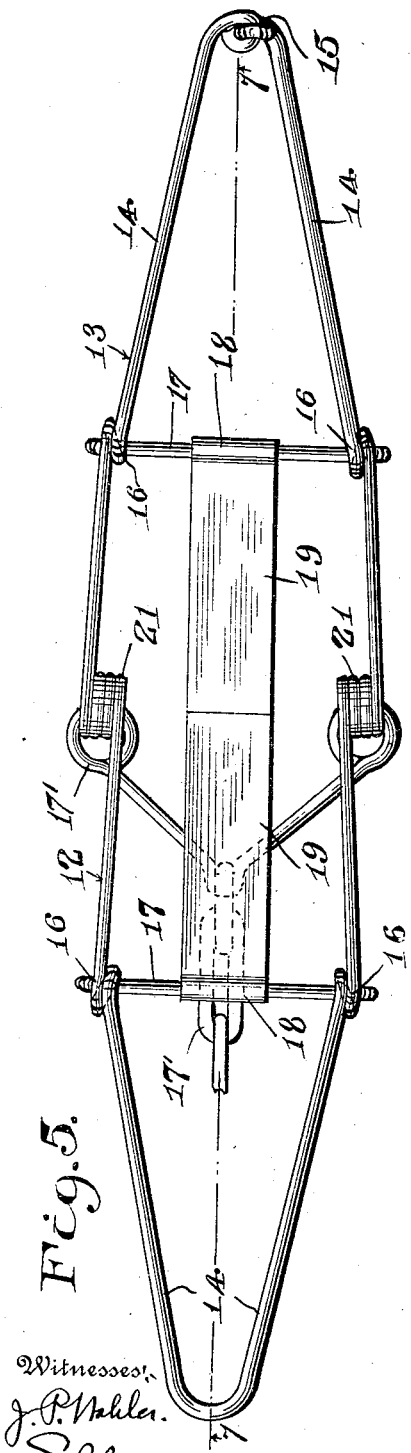
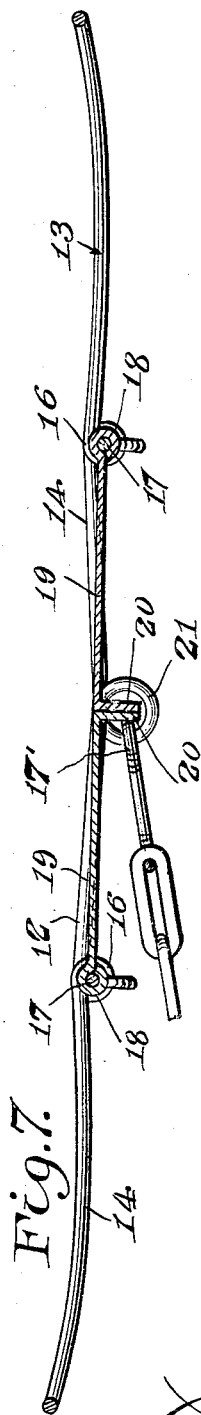
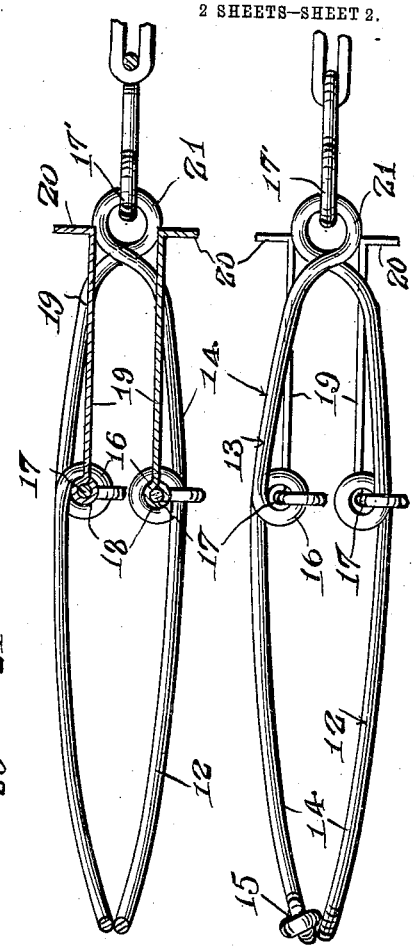
Inventor,
F. A. Brayman.

UNITED STATES PATENT OFFICE.

FRANK A. BRAYMAN, OF BENTON HARBOR, MICHIGAN.

TRAP.

1,071,025. Specification of Letters Patent. Patented Aug. 26, 1913.

Application filed July 25, 1912. Serial No. 711,498.

*To all whom it may concern:*

Be it known that I, FRANK A. BRAYMAN, a citizen of the United States, residing at Benton Harbor, in the county of Berrien, State of Michigan, have invented certain new and useful Improvements in Traps; and I do hereby declare the following to be a full, clear, and exact description of the invention, such as will enable others skilled in the art to which it appertains to make and use the same.

This invention is directed to improvements in animal traps.

The invention has for its object to provide a trap of this type which is simple in construction, and one which will operate to trap an animal in an efficient manner.

A further object of the invention is to so construct a device of this type that the same when sprung will prevent the animal from gnawing the leg off and escaping which now frequently occurs with the jaw traps in general use.

With these and other objects in view, this invention resides in the novel features of construction, formations, combinations and arrangements of parts to be hereinafter more fully described, claimed and illustrated in the accompanying drawings, in which:—

Figure 1 is a top plan view of the trap in its set position. Fig. 2 is a side elevation of the same showing the trap after being sprung. Fig. 3 is a sectional view on line 3—3 of Fig. 1. Fig. 4 is a longitudinal sectional view through the device showing the jaws released. Fig. 5 is a top plan view of a slightly modified form of the invention. Fig. 6 is a side elevation of the same in its sprung position. Fig. 7 is a sectional view on line 7—7 of Fig. 5. Fig. 8 is a longitudinal sectional view through the modified form of the invention, showing the jaws released.

The trap consists of a single length of resilient wire which constitutes jaws 1 and 2, each jaw consisting of spaced side bars 3, the same being connected by end bars 4. One end of the side bar 3 and end bar 4 of the jaw 1 are provided with eyes 5 and 6, respectively, said eyes being interlocked, thus producing a substantially rigid jaw. The inner ends of the side bars 3 terminate in coil springs 7, which tend to normally hold the jaws clamped together, that is to say when the trap is in its released position. A pair of trip plates 8 are provided, the same being formed from metal and have their major ends so cut as to provide a pair of spaced sleeves 9 which pivotally engage the end bars 4 of the jaws. Formed integral with the outer edges of the plates 8 and between the sleeves 9 is a plurality of angularly disposed teeth 10, which interlock when the jaws are sprung, thus firmly gripping the leg or legs of the animal. The minor ends of the trip plates 8 are formed with right angle extensions 11, which are adapted to abut, thus serving to hold the jaws in their open position, the engagement between the said extensions being such that when an animal steps upon the plates the same will be permitted to swing downwardly upon the end bars 3, whereupon the coils 7 will spring the jaws together.

From this construction it will be noted that after the trap has been sprung by an animal, and the leg thereof is gripped by the teeth 10 it will be impossible for the animal to gnaw the leg and escape, owing to the fact that the leg will be embraced by said plate, thus effectually protecting the same.

In the modified form of the invention the jaws 12 and 13 are formed from a single length of wire, the jaw 13 having its side bars 14 interlocked, as at 15. The side bars of the jaw are provided intermediate their length with loops 16 which are engaged by the opposite ends of a bar 17 and to which is pivotally connected the sleeve 18 of the trip plates 19, said trip plates being also provided with right angle extensions 20, which act in the manner similar to the extensions 11 of the preferred form of the invention. The inner ends of the arms 14 terminate in spring coils 21, which serve to force the jaws together when the plates 19 are tripped by an animal. The jaws 12 and 13 are elongated so that when the trap is sprung said jaws will embrace the body of the animal, thus securely holding the same.

An anchoring device 12' for the trap is provided and is secured to the coils 8, and which may be secured to any fixed object to prevent the animal from carrying away the trap, a similar anchoring device 17' being provided for the modified form of the invention and engages the coils 21. It will be further noted that when the trap is set upon the ground the coils will support the same a sufficient distance above the ground to permit a slight movement of the plates downwardly when an animal steps thereon.

What is claimed is:—

An animal trap consisting of a single length of wire so bent as to provide a pair of jaws comprising side and end bars, the inner ends of the side bars terminating in coil springs for forcing said jaws together, eyes formed upon one of the side and end bars and adapted to interlock, tapered trip plates having sleeves formed integral with their major ends for pivotally engaging the end bars, a plurality of teeth formed upon said plates and between the sleeves, right angle extensions formed upon the minor ends of the plates and adapted to contact to hold the jaws in their set position.

In testimony whereof, I affix my signature in presence of two witnesses.

FRANK A. BRAYMAN.

Witnesses:
MAYBELL E. MARSH,
FLORENCE EDMUNDS.